(12) United States Patent
Murata

(10) Patent No.: US 7,950,483 B2
(45) Date of Patent: May 31, 2011

(54) WHEEL ASSEMBLY WITH IN-WHEEL MOTOR

(75) Inventor: Satoshi Murata, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 850 days.

(21) Appl. No.: 11/837,080

(22) Filed: Aug. 10, 2007

(65) Prior Publication Data

US 2008/0036284 A1 Feb. 14, 2008

(30) Foreign Application Priority Data

Aug. 11, 2006 (JP) .................................. 2006-219762

(51) Int. Cl.
*B60K 7/00* (2006.01)
(52) U.S. Cl. ..................................... 180/65.51; 180/65.6
(58) Field of Classification Search ................. 180/65.1, 180/65.6, 65.51, 65.7
See application file for complete search history.

(56) References Cited

U.S. PATENT DOCUMENTS

| | | | | |
|---|---|---|---|---|
| 2,039,513 | A | * | 5/1936 | Baker .......................... 180/65.51 |
| 2,726,726 | A | * | 12/1955 | Le Tourneau ............... 180/65.51 |
| 3,469,646 | A | * | 9/1969 | O'Connor ...................... 180/255 |
| 3,754,625 | A | * | 8/1973 | Voth et al. ................... 192/221.1 |
| 3,762,726 | A | * | 10/1973 | Jornhagen ...................... 277/568 |
| 4,121,871 | A | * | 10/1978 | Adams, Jr. .................. 301/105.1 |
| 4,799,564 | A | | 1/1989 | Iijima et al. |
| 5,382,854 | A | * | 1/1995 | Kawamoto et al. ......... 310/67 R |
| 6,722,459 | B1 | * | 4/2004 | Wendl et al. ................ 180/65.51 |
| 2005/0257970 | A1 | * | 11/2005 | Kakinami et al. ............ 180/65.5 |
| 2006/0144626 | A1 | * | 7/2006 | Mizutani et al. .............. 180/65.5 |

FOREIGN PATENT DOCUMENTS

| | | |
|---|---|---|
| DE | 26 49 663 | 5/1977 |
| DE | 199 32 587 | 1/2001 |
| FR | 2776966 | * 10/1999 |
| JP | 2001-315534 | 11/2001 |
| JP | 2004-90822 | 3/2004 |
| JP | 2004-168211 | 6/2004 |
| WO | 2005/000621 A1 * | 1/2005 |
| WO | WO 2005/110796 A1 | 11/2005 |

OTHER PUBLICATIONS

Office Action issued on Jan. 28, 2011 in German Application No. 10 2007 037 833.7 (with English Translation), 10 pages.

* cited by examiner

*Primary Examiner* — Frank B Vanaman
(74) *Attorney, Agent, or Firm* — Oblon, Spivak, McClelland, Maier & Neustadt, L.L.P.

(57) ABSTRACT

A wheel assembly with an in-wheel motor, which transmits rotational output of an output shaft of a motor to a wheel via a counter gear, is such that a bearing on a vehicle outside, from among bearings provided on the vehicle inside and the vehicle outside in a vehicle width direction which rotatably support the output shaft of the motor, and a bearing on the vehicle inside, from among bearings provided on the vehicle inside and the vehicle outside in the vehicle width direction which rotatably support a rotating center shaft of the counter gear, are housed inside a main structure portion of a knuckle that defines a load transfer path.

2 Claims, 3 Drawing Sheets

←VEHICLE INSIDE    VEHICLE OUTSIDE→

WHEEL ASSEMBLY WITH IN-WHEEL MOTOR

INCORPORATION BY REFERENCE

The disclosure of Japanese Patent Application No. 2006-219762 filed on Aug. 11, 2006, including the specification, drawings and abstract is incorporated herein by reference in its entirety.

BACKGROUND OF THE INVENTION

1. Field of the Invention

The invention relates to a wheel assembly with an in-wheel motor, which transmits rotational output of the motor to a wheel via a counter gear.

2. Description of the Related Art

A vehicle having a related wheel assembly with an in-wheel motor that can individually control the braking/driving force of each wheel is known. There are many types of wheel assemblies with in-wheel motors, some of which transmit output from the motor to the wheel via reduction gears, while others transmit output of the motor directly to the wheel using a direct drive method without going through reduction gears. Japanese Patent Application Publication No. JP-A-2004-90822, for example, describes one of the former types, in which an output shaft of the motor is arranged offset in the longitudinal direction with respect to an axle center.

In the foregoing wheel assembly with an in-wheel motor, a pair of bearings are usually installed for the output shaft of the motor and the rotating center shaft of the reduction mechanism. In order to prevent noise, each gear of the reduction mechanism normally has an angle of torsion (i.e., helical gears are normally used instead of spur gears). This angle of torsion, however, generates axial force (i.e., thrust force). Therefore, the bearings that receive this axial force must be supported by members having high strength and rigidity. However, making the portions that support these bearings extremely strong and rigid by increasing their thickness also increases weight and reduces space within the wheels, which is unreasonable.

SUMMARY OF THE INVENTION

This invention thus provides a reasonable structure that appropriately arranges bearings provided for an output shaft of a motor and a rotating center shaft of a counter gear, and which can withstand the axial force of the bearings but does not lead to an increase in weight and the like.

A first aspect of the invention relates to a wheel assembly with an in-wheel motor, which transmits rotational output of an output shaft of a motor to a wheel via a counter gear. In this wheel assembly with an in-wheel motor, a bearing on a vehicle outside, from among bearings provided on a vehicle inside and the vehicle outside in a vehicle width direction which rotatably support the output shaft of the motor, and a bearing on the vehicle inside, from among bearings provided on the vehicle inside and the vehicle outside in the vehicle width direction which rotatably support a rotating center shaft of the counter gear, are housed inside a main structure portion of a knuckle that defines a load transfer path.

A second aspect of the invention relates to the wheel assembly with an in-wheel motor according to the first aspect, in which, of the bearings provided on the vehicle inside and the vehicle outside which rotatably support the output shaft of the motor, the bearing on the vehicle outside has a larger load capacity than the bearing on the vehicle inside, and of the bearings provided on the vehicle inside and the vehicle outside which rotatably support the rotating center shaft of the counter gear, the bearing on the vehicle inside has a larger load capacity than the bearing on the vehicle outside.

This invention makes it possible to realize a reasonable structure that appropriately arranges bearings provided for an output shaft of a motor and a rotating center shaft of a counter gear, and which can withstand the axial force of the bearings but does not lead to an increase in weight and the like.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

In the following description and the accompanying drawings, the present invention will be described in more detail in terms of exemplary embodiments.

Figure 1:
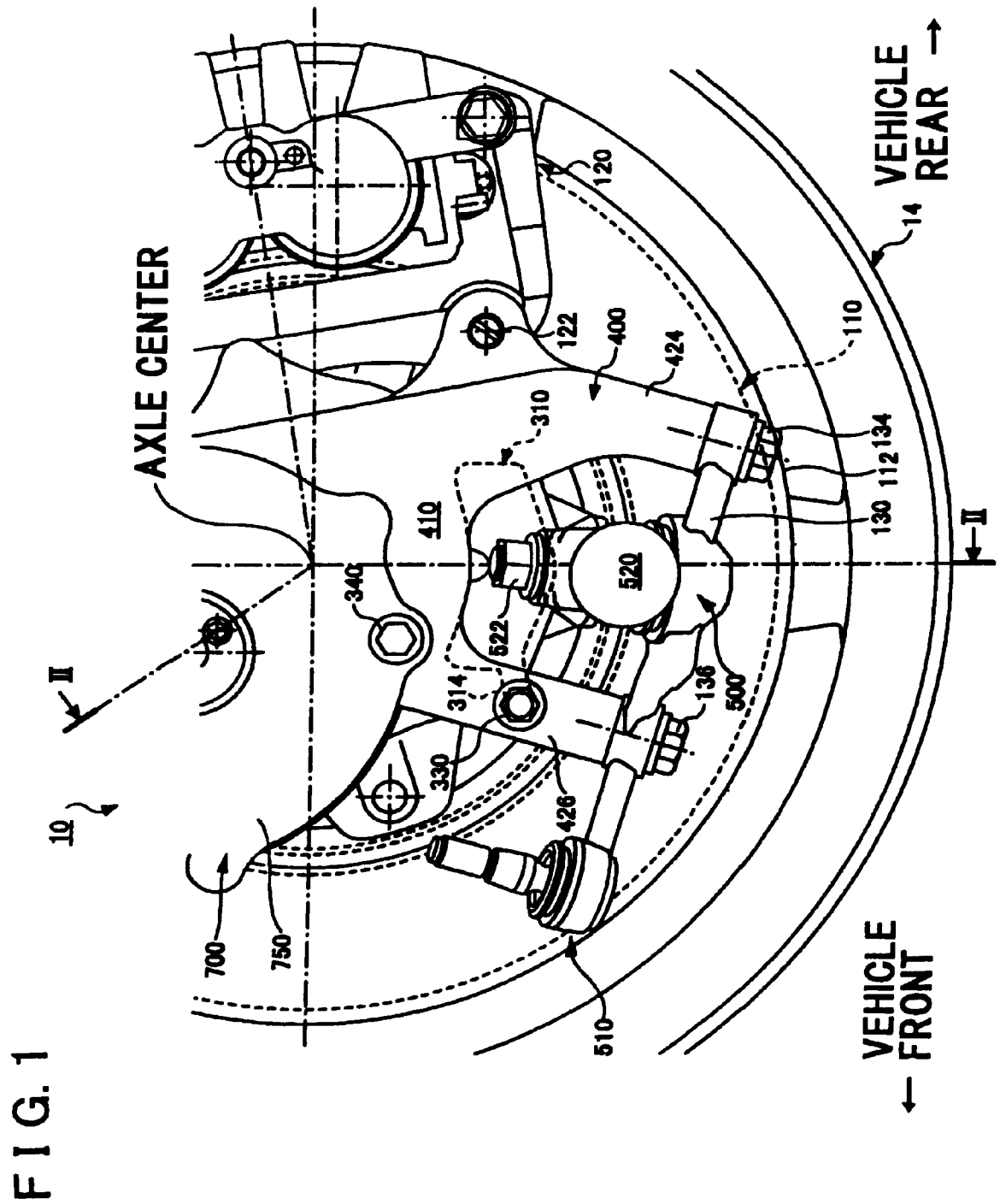
FIG. 1 is a view of a wheel assembly with an in-wheel motor as viewed from the vehicle inside.
Figure 2:
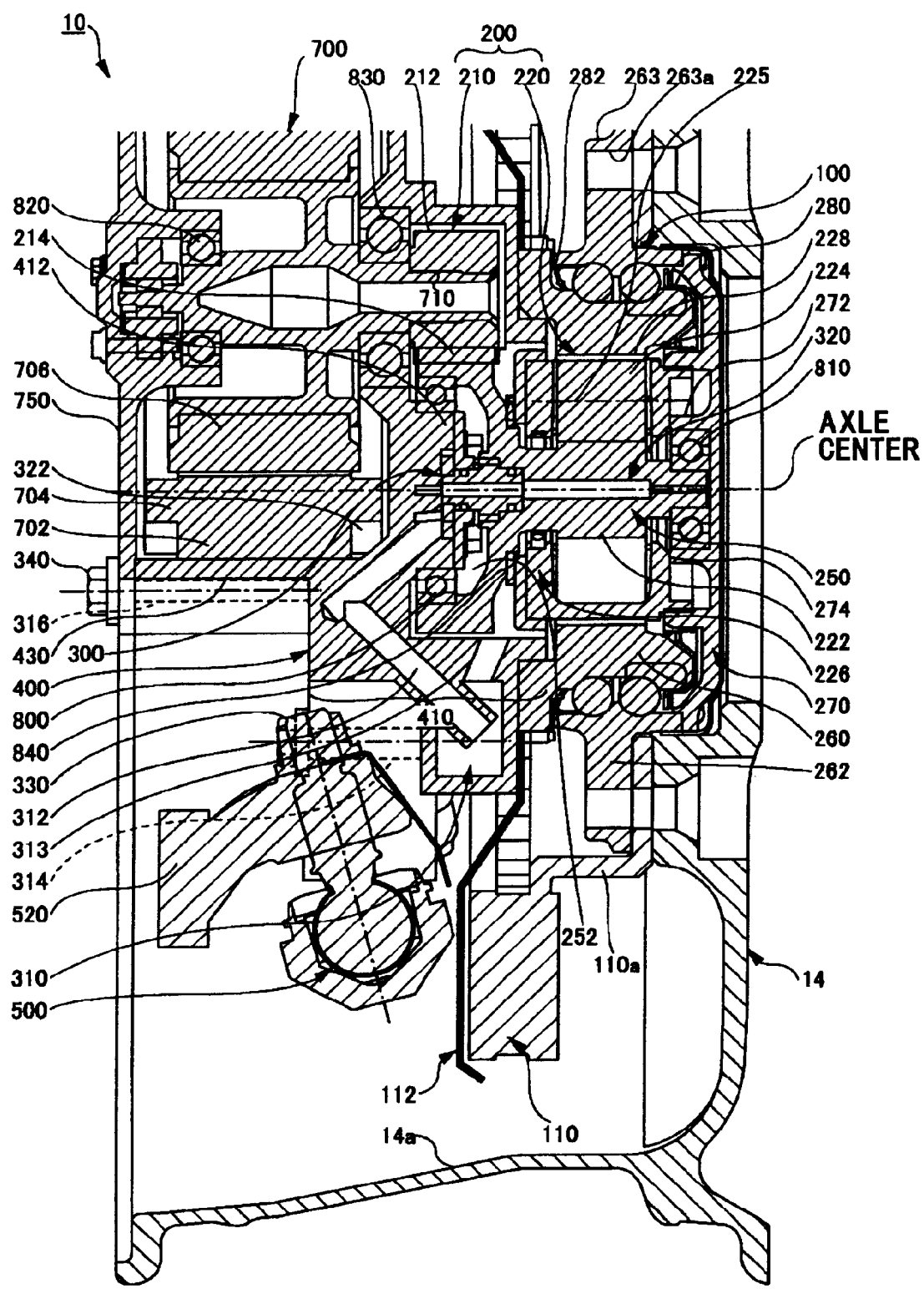
FIG. 2 is a sectional view of the wheel assembly with an in-wheel motor taken along line II-II in FIG. 1.
Figure 3:
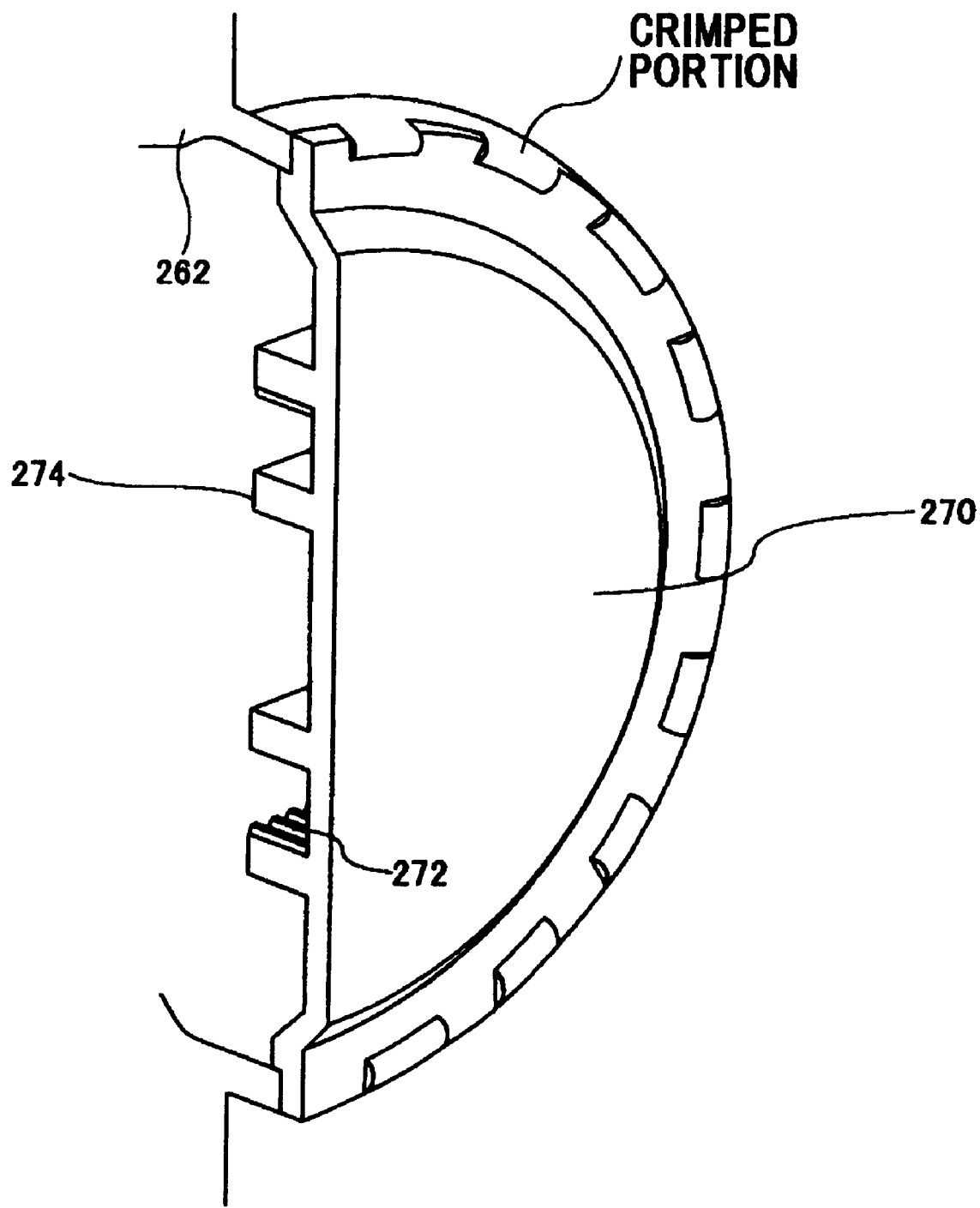
FIG. 3 is a perspective view of an example of a method for connecting an outer race side member to a power transmitting member.

FIGS. 1 and 2 are views of a wheel assembly with an in-wheel motor (the term "in-wheel motor" in this specification refers to a motor that is housed within a wheel) according to one example embodiment of the invention. FIG. 1 is a view of the wheel assembly from the vehicle inside and FIG. 2 is a sectional view taken along line II-II in FIG. 1. FIG. 3 is a perspective view of an example of a method for connecting an outer race side member 262 to a power transmitting member 270. In FIG. 1, the left side of the drawing corresponds to the front side of the vehicle. In FIGS. 1 and 2, the tire, as well as the upper ⅓ or so of the wheel, is omitted.

A tire/wheel assembly 10 includes a wheel 14 to which a tire, not shown, is mounted. As will be described in detail later, the main portions of the constituent elements related to the motor are housed in a space enclosed by a rim inner peripheral surface 14a of the wheel 14. In the following description, the words "inside of the tire/wheel assembly" refer to the generally columnar space that is enclosed by the rim inner peripheral surface 14a of the wheel 14. However, expressions such as "a part is arranged inside the tire/wheel assembly" do not always mean that the entire part is housed completely within this generally columnar space. They also include structures in which a portion of the part partially protrudes from within that generally columnar space.

Arranged within the tire/wheel assembly 10 are mainly an axle bearing 100, a brake disc 110, a brake dust cover 112 that covers the brake disc 110 from the inner side of the vehicle in the vehicle width direction (hereinafter also referred to simply as "vehicle inside"), a brake caliper 120, a motor 700 for driving the wheel, a reduction mechanism 200, an oil pump 300, an oil tank 310, an oil flow path 320 (only part of which is shown), a knuckle (i.e., a carrier) 400, a lower ball joint 500 that is connected to a wheel-side end portion of a lower arm 520, and a ball joint 510 that is connected to a wheel-side end portion of a tie rod, not shown, (hereinafter referred to as "tie rod B/J 510"). Also, although not shown, an upper ball joint that is connected to the wheel-side end portion of an upper arm is also arranged in the tire/wheel assembly 10. However, when strut type suspension is used, the lower end of the strut (i.e., shock absorber), instead of the upper arm, is connected to the upper side of the knuckle 400.

The motor 700 is arranged in a space on the vehicle inside within the tire/wheel assembly 10. The motor 700 is arranged offset upward, in the height direction of the vehicle, as shown in FIG. 2, and forward, in the longitudinal direction of the vehicle, as shown in FIG. 1, with respect to the axle center. Accordingly, a space not occupied by the motor 700, which corresponds to the amount that the motor 700 is offset, is created to the lower rear on the vehicle inside within the tire/wheel assembly 10, as shown in FIG. 1. Therefore, the lower space on the vehicle inside within the tire/wheel assembly 10 is larger than it is with a structure in which the motor is arranged on the same axis as the axle center. As a result, there is a larger degree of freedom for arranging the suspension on the lower side. Also, the brake caliper 120 can easily be housed on the side (i.e., the vehicle rear side in this example) opposite the side (i.e., the vehicle front side) to which the motor 700 is offset within the tire/wheel assembly 10, as shown in FIG. 1.

The motor 700 includes a stator core 702, a stator coil 704, and a rotor 706. If the motor 700 is a three phase motor, the stator coil 704 may include a U phase coil, a V phase coil, and a W phase coil. The rotor 706 is arranged on the inner peripheral sides of the stator core 702 and the stator coil 704.

The rotor 706 of the motor 700 has an output shaft 710, the rotational center of which is offset with respect to the axle center, as described above.

The output shaft 710 is connected to the inner race side of the bearing 820 on the vehicle inside within the tire/wheel assembly 10. The outer race side of the bearing 820 is connected to a motor cover 750. Accordingly, the output shaft 710 is rotatably supported by the motor cover 750 via the bearing 820 on the vehicle inside. Similarly, the output shaft 710 is connected to the inner race side of the bearing 830 on the outer side of the vehicle in the vehicle width direction (hereinafter also referred to simply as "vehicle outside") within the tire/wheel assembly 10. The outer race side of the bearing 830 is connected to the knuckle 400. Accordingly, the output shaft 710 is rotatably supported by the knuckle 400 via the bearing 830 on the vehicle outside. The bearings 820 and 830 may be radial ball bearings which use balls as rolling bodies, such as single-row, deep-grooved ball bearings, for example.

The rotational output of the motor 700 is transmitted to the wheel 14 via the reduction mechanism 200. The reduction mechanism 200 is a twin shaft reduction mechanism which includes a counter gear mechanism 210 and a planetary gear set 220. Thus the reduction mechanism 200 realizes a two step reduction. Gears 212, 214, 222, 224, 226, and 228 of the reduction mechanism 200, which will be described below, are helical gears.

As shown in FIG. 2, the counter gear mechanism 210 is arranged farther to the vehicle outside than the motor 700. The counter gear mechanism 210 includes a small diameter driving gear 212 which is arranged on the output shaft 710 of the motor 700, and a large diameter driven gear (i.e., a counter gear) 214 that is in mesh with the driving gear 212. The small diameter driving gear 212 is spline fitted and crimped to the output shaft 710 of the motor 700 from the vehicle outside, and thus integrated with the output shaft 710. At this time, the vehicle inside end surface of the driving gear 212 corresponds to the inner race side of the bearing 830 that is connected to the output shaft 710 of the motor 700. The large diameter counter gear 214 is formed with the axle center as its rotational center. The output shaft 710 of the motor 700 is arranged offset with respect to the axle center by approximately the distance of the combined radii of the driving gear 212 and the counter gear 214.

As shown in FIG. 2, the planetary gear set 220 is arranged farther to the vehicle outside than the counter gear mechanism 210 within the tire/wheel assembly 10. The planetary gear set 220 is arranged on the same axis as the axle center, and includes a sun gear 222, a planetary gear 224, a planetary carrier 226, and a ring gear 228.

The sun gear 222 is connected to the counter gear 214 of the counter gear mechanism 210. In the example shown in FIG. 2, the sun gear 222 is formed on one end side of a shaft (i.e., sun gear shaft) 250 and the counter gear 214 is formed on the other end side of the shaft 250 in the width direction of the vehicle. That is, the rotational center of the shaft 250 is on the same axis as the axle center. The sun gear 222 is formed on the peripheral surface of the vehicle outside end portion of the shaft 250 and the counter gear 214 is formed on the peripheral surface of the vehicle inside end portion of the shaft 250. The shaft 250 is also the rotating center shaft of the counter gear 214. The sun gear 222 and the counter gear 214 may also be formed as separate parts, in which case they may be connected using splines. In this case, the two parts form the rotating center shaft of the counter gear 214.

The end portion of the shaft 250 on the vehicle inside is connected to the outer race side of the bearing 800. As shown in FIG. 2, the bearing 800 may be incorporated inside (i.e., on the inner peripheral side of) the counter gear 214, and a convex portion 412 of the knuckle 400 connected by press-fitting or the like to the inner race side of the bearing 800. Accordingly, the shaft 250 is rotatably supported on the vehicle inside by the knuckle 400 via the bearing 800. Similarly, the vehicle outside end portion of the shaft 250 is connected to the inner race side of a bearing 810. The bearing 810 is connected by press-fitting or the like to the inner peripheral side of a peripheral wall of a disc-shaped power transmitting member 270. Accordingly, the shaft 250 is rotatably supported on the vehicle outside by the power transmitting member 270 via the bearing 810. Also, the bearings 800 and 810 may be radial ball bearings which use balls as rolling bodies, such as single-row, deep-grooved ball bearings, for example.

The planetary gear 224 is in mesh with the sun gear 222 on the inner peripheral side and in mesh with the ring gear 228 on the outer peripheral side. The planetary gear 224 is rotatably supported around a roller shaft 225 via a roller bearing by the planetary carrier 226. The rotational center of the planetary carrier 226 is the same as the axle center. The planetary carrier 226 is supported at the vehicle inside within the tire/wheel assembly 10 by the shaft 250 via a thrust cylindrical roller bearing 840, and is spline fitted at the vehicle outside to a circumferential groove 272 (see FIG. 3) formed circumferentially in the power transmitting member 270. A plurality of the planetary gears 224 are arranged at equidistant intervals around the sun gear 222. The planetary gears 224 and the planetary carrier 226 are assembled to form a single unit (hereinafter referred to as "planetary gear unit"). The planetary carrier 226 of this planetary gear unit abuts against a stopper portion 274 of the power transmitting member 270 on the vehicle outside. Accordingly, displacement of the planetary gear unit in the width direction of the vehicle is restricted by the thrust cylindrical roller bearing 840 and the stopper portion 274.

The rotational center of the ring gear 228 is the same as the axle center. The ring gear 228 is formed on the inner peripheral surface of an inner race side member 260 that is arranged so as to surround the sun gear 222 from the outer peripheral side. The outer peripheral surface of the inner race side member 260 forms an inner race of the axle bearing 100. In the illustrated example, the axle bearing 100 is a double-row angular ball bearing. The outer inner race with respect to the row on the vehicle outside is formed of a separate member than the inner race side member 260. This kind of separate member is integrated with the inner race side member 260 by fitting it around the outer periphery of the inner race side member 260 and crimping it thereto.

An outer race side member 262 is arranged so as to surround the inner race side member 260 from the outer peripheral side. The inner peripheral surface of the outer race side member 262 forms an outer race of the axle bearing 100. Seals 280 and 282 for preventing foreign matter from getting in and oil from flowing out are provided at the end portions in the width direction of the vehicle between the outer race side member 262 and the inner race side member 260.

The power transmitting member 270 is a disc-shaped member provided so as to cover the vehicle outside of the reduction mechanism. The circumferential groove 272 to which the vehicle outside end portion (peripheral wall portion) of the planetary carrier 226 is spline fitted is formed on the vehicle inside of the power transmitting member 270. The outer peripheral edge of the power transmitting member 270 is connected to the end portion on the vehicle outside of the outer race side member 262 by crimping or the like, as shown in FIG. 3. That is, the power transmitting member 270 is fixed to the outer race side member 262 so that it blocks a generally circular opening on the vehicle outside of the outer race side member 262. The outer race side member 262 has a flange portion 263 that protrudes toward the outside in the radial direction on the outer peripheral surface. A bolt hole 263a for fastening a hub bolt, not shown, is formed in this flange portion 263. The outer race side member 262 is fastened together with the brake disc 110 by the hub bolt to the wheel 14 with the inner peripheral portion of the brake disc 110 being sandwiched between the flange portion 263 and the wheel 14.

In the foregoing structure, when the rotor 706 of the motor 700 rotates in response to a command from a vehicle control apparatus, not shown, the small diameter driving gear 212 of the counter gear mechanism 210 rotates, and as it does so, the large diameter counter gear 214 that is in mesh with the driving gear 212 rotates, thus realizing a first reduction. When the counter gear 214 rotates, the sun gear 222, which is integral with the counter gear 214, also rotates. As a result, the planetary gears 224 rotate while revolving around the sun gear 222. This rotation realizes a second reduction. The revolving motion of the planetary gears 224 is output by the planetary carrier 226 and transmitted to the power transmitting member 270 which is spline fitted to the planetary carrier 226. The tire/wheel assembly 10 is driven as the outer race side member 262, the brake disc 110, and the wheel 14 all rotate together with the power transmitting member 270.

The oil pump 300 is arranged between the motor 700 and the planetary gear set 220 of the reduction mechanism 200 in the width direction of the vehicle. More specifically, the oil pump 300 is provided on the vehicle inside end portion of the shaft 250. In the example shown in FIG. 2, the oil pump 300 is arranged inside the counter gear 214 of the counter gear mechanism 210, i.e., to the inside of the counter gear 214 in the radial direction. In other words, the convex portion 412 of the knuckle 400 is accommodated within a cavity 252 formed in the vehicle inside end portion (i.e., a portion with a larger diameter) of the shaft 250. A concave portion is formed to the inside of the convex portion 412 in the radial direction. The oil pump 300 is provided in this concave portion. The oil pump 300 may not only be a trochoid pump as shown in the drawings, but any one of a variety of gear pumps such as an external gear pump or an internal gear pump (with or without a crescent-shaped partition), or another type of hydraulic pump such as a vane pump, for example.

The oil pump 300 is driven by rotational output of the motor 700. More specifically, the inner rotor of the oil pump 300 is connected to the vehicle inside end portion of the shaft 250, and thus rotates when the shaft 250 rotates. That is, the inner rotor of the oil pump 300 is driven by the same shaft that the counter gear 214 is provided on. When the inner rotor rotates, oil in the oil tank (i.e., oil reservoir) 310 is drawn up via a suction path 312. The oil that is drawn in through an inlet, not shown, is then caught between the inner and outer rotors of the oil pump 300 and discharged from an outlet, not shown, to the oil flow path 320.

In this example embodiment, as described above, the oil pump 300 is driven by same shaft that the counter gear 214 is provided on. Therefore, the oil pump 300 is driven at a speed that is slower than the speed of the motor 700 by the amount corresponding to the speed reduction from the counter gear mechanism 210. As a result, the fastest rotation speed of the oil pump 300 is less than it is when the oil pump 300 is driven by the output shaft 710 of the motor 700, which improves the durability of the oil pump 300.

Also, in this example embodiment, as described above, the oil pump 300 is set inside the shaft 250 (i.e., inside the counter gear 214) and arranged in substantially the same area as the counter gear mechanism 210 in the width direction of the vehicle. Therefore, the length in the axial direction necessary to arrange the motor 700, the oil pump 300, and the reduction mechanism 200 can be shortened by the amount of the oil pump 300 compared to when the motor, oil pump, and reduction mechanism are arranged in series.

Also, as described above, in this example embodiment, the oil pump 300 is arranged between the motor 700 and the planetary gear set 220 of the reduction mechanism 200. Therefore, it is easy to the arrange oil flow path 320 for cooling the motor 700 or lubricating the reduction mechanism 200 and the various bearings (such as the bearings 800, 810, 820, and 830). While the path of the oil flow path 320 will not be described in detail here, the oil in the oil flow path 320 formed inside the shaft 250 is supplied to the bearing 810, and supplied to the planetary gears 224 via oil holes, not shown, by centrifugal force generated as the shaft 250 rotates, for example. The oil supplied in this way is used to lubricate the bearing 810 as well as the roller bearings which are at the rotational centers of the planetary gears 224. Further, the oil from the oil pump 300 is used to cool the stator coil 704 and lubricate the bearings 800, 820, and 830 via the oil flow path 320 (which is not shown in the cross section in FIG. 2) formed using the space 322 near the coil end of the stator coil 704. The oil used for cooling or lubrication as described above is then finally returned to the oil tank 310 by gravity.

The oil tank 310 is formed below the knuckle 400 and is arranged below, along a vertical line that is orthogonal to, the axle center in the tire/wheel assembly 10, as shown in FIG. 2. Also, the oil tank 310 is arranged farther to the vehicle outside than the lower ball joint 500 and farther to the vehicle inside than the brake dust cover 112, as shown in FIG. 2. The oil tank 310 is arranged using the space inside a hat portion 110a of the brake disc 110. A lower end portion of the suction path 312 formed in the knuckle 400, as well as an oil return path 313 for returning oil, is communicated with the oil tank 310.

The oil tank 310 serves to collect oil for cooling the motor 700 or lubricating the reduction mechanism 200, as described above.

A drain plug 330 is a removable plug that blocks the opening of a drain flow path 314 of the oil tank 310, and can be removed when draining used oil from inside the oil tank 310, such as when changing the oil, for example. The drain flow path 314 is formed so that it is connected to the oil tank 310 inside the knuckle 400. Also, the drain flow path 314 has an opening on the vehicle inside surface of the knuckle 400. The drain plug 330 which is liquid-tight is attached to the opening. The drain plug 330 is arranged offset toward the front of the vehicle with respect to the lower ball joint 500, as shown in FIG. 1.

A filler plug 340 is a removable plug that blocks the opening of a filler flow path 316 (only a portion of which is shown) of the oil tank 310, and can be removed when filling the oil tank 310 with new oil, such as when changing the oil, for example. The filler flow path 316 is formed so that it is communicated with the oil tank 310 inside the knuckle 400. In this example, the filler flow path 316 is formed in the vehicle width direction in a peripheral wall portion 430 of the knuckle 400, as shown in FIGS. 1 and 2. The filler flow path 316 has an opening on the vehicle inside surface of the inner peripheral portion 430, and the filler plug 340, which is liquid-tight, is attached to the opening. The filler plug 340 is arranged farther to the vehicle inside than the lower ball joint 500, as shown in FIG. 2.

The knuckle 400 has a cylindrical peripheral wall portion (i.e., a motor case portion) 430. The main constituent elements of the motor 700 described above are arranged in a space to the inside in the radial direction of the peripheral wall portion 430 of the knuckle 400. The motor cover 750 is connected to the end portion on the vehicle inside of the peripheral wall portion 430 of the knuckle 400 so as to cover the space inside the peripheral wall portion 430.

The knuckle 400 has two leg portions 424 and 426 that extend from the lower side. A knuckle arm 130 is fastened by bolts 134 and 136 to the lower end of the each leg portion 424 and 426. The knuckle arm 130 extends in the longitudinal direction of the vehicle within the tire/wheel assembly 10. The tie rod B/J 510 is installed on the front end side of the knuckle arm 130 and the lower ball joint 500 is installed on the rear end side of the knuckle arm 130. The knuckle 400 receives various lateral and vertical loads generated at the connecting portions of the lower ball joint 500 and the tie rod B/J 510 when the wheel is being steered or weighted/unweighted or the like.

Lower ball joint 500 is arranged between the two leg portions 424 and 426 in the longitudinal direction of the vehicle and generally in the center of the tire/wheel assembly 10 in the longitudinal direction of the vehicle, as shown in FIG. 1. Also, as shown in FIG. 2, the lower ball joint 500 is arranged farther toward the vehicle inside than the brake disc 110. The lower arm 520 is fastened to the lower ball joint 500 by a nut 522 from above. The lower arm 520 extends in the width direction of the vehicle and the vehicle inside end portion is supported by a vehicle body, not shown, via a bush and the like. The lower arm 520 may be any type. For example, it may be an L-shaped lower arm or a double ring type lower arm. The lower arm 520 works in cooperation with the upper arm (or strut), not shown, to pivotally support the tire/wheel assembly 10 with respect to the vehicle body. Also, a spring and an absorber, not shown, are provided between the vehicle body and the lower arm 520. As a result, input from the tire/wheel assembly 10 to the vehicle body is reduced. The spring may be any type of spring coil or air spring. Also, the absorber may not only be a hydraulic absorber that applies damping action to vertical input, but also a rotary electromagnetic absorber that applies damping action to rotational input.

In this example embodiment, the motor 700 is offset upward with respect to the axle center, as described above. This increases the degree of freedom in the arrangement/position of the lower ball joint 500 (i.e. in the arrangement of the kingpin axis). For example, the lower ball joint 500 can also be moved as close to the brake disc 110 as possible, leaving only the necessary clearance, as shown in FIG. 2. As a result, the amount of offset of each member and the tire input point in the width direction of the vehicle is reduced, thereby enabling the necessary strength and rigidity of the members (such as the knuckle) to be reduced, which reduces weight.

As shown in FIG. 1, the tie rod B/J 510 is arranged farther to the front than the front leg portion 426 in the longitudinal direction of the vehicle. The tie rod B/J 510 is also arranged farther to the vehicle inside than the brake disc 110. A tie rod, not shown, is fastened to the tie rod B/J 510 by a nut, not shown, from above. The tie rod extends in the width direction of the vehicle and the vehicle inside end portion is connected to a rack shaft, not shown, which is connected to a steering shaft by a rack and pinion mechanism, for example, thus enabling the tire/wheel assembly 10 to be steered. In this way, according to this example embodiment, the motor 700 is offset above the axle center, as described above, which makes it easy to fit the tie rod B/J 510 inside the tire/wheel assembly 10.

As shown in FIG. 1, mounting points 122 (only one point is shown in the drawing) for the brake caliper 120 arranged on the vehicle rear side with respect to the motor 700 are installed on the knuckle 400. The knuckle 400 receives the loads input during braking via the mounting points 122 for the brake caliper 120. In the example shown in the drawing, the lower mounting point 122 of the brake caliper 120 is set near the base of the leg portion 424 to the vehicle rear of the knuckle 400. Making this kind of extremely strong and rigid portion a mounting portion for the brake caliper 120 enables a reasonable structure to be achieved.

The inner race side member 260 is connected by press-fitting or a bolt, for example, to the vehicle outside end portion of the knuckle 400. The knuckle 400 receives the various loads that are generated at the connecting portion of the inner race side member 260 (i.e., the axle bearing 100) from input from the tire/wheel assembly 10 and the like.

In this way, the knuckle 400 serves to receive loads input via the axle bearing 100, the mounting points for the tie rod and the suspension arm (i.e., lower arm 520, etc.), and the mounting point for the brake caliper 120. At these input points, the knuckle 400 is formed thick in order to ensure the necessary strength and rigidity, and thus is extremely strong and rigid. The portion of the knuckle 400 with high strength and rigidity, unlike the thin peripheral wall portion 430 and other ribs and the like, will be referred to as the "main structure portion 410 of the knuckle 400". That is, the main structure portion 410 of the knuckle 400 is a portion that defines the transfer path of the load input via the axle bearing 100 and the like, and refers to the portion that connects the connecting portion of the axle bearing 100, the mounting points of the tie rod and the suspension arm (i.e., the lower arm 520, etc.), and the mounting point for the brake caliper 120.

The general area of the main structure portion 410 of the knuckle 400 is shown in FIG. 2. In the example shown in the drawing, the main structure portion 410 of the knuckle 400 extends in the vehicle width direction generally from the connecting portion of the axle bearing 100 to the input point of the suspension arm that is farthest to the vehicle inside.

In this example embodiment, the portion to which the axle bearing 100 connects, the portion to which the knuckle arm 130 connects, and the portion to which the brake caliper 120 connects, etc., which are the main input points, are all concentrated near the center of the tire/wheel assembly 10 in the vehicle width direction, as described above (i.e., they are all arranged between the motor 700 and the planetary gear set 220 in the vehicle width direction). Therefore, the portion of the knuckle 400 with high strength and rigidity, i.e., the main structure portion 410 of the knuckle 400, can be concentrated near the center of the tire/wheel assembly 10. Accordingly, the weight of the overall knuckle 400 can be reduced while efficiently maintaining the necessary strength and rigidity of the knuckle 400 compared with a structure in which the main input points are spread out over a wide area in the vehicle width direction.

The counter gear mechanism 210 described above is arranged inside the main structure portion 410 of the knuckle 400. Also, the bearing 830 and the bearing 800 are supported by the main structure portion 410 of the knuckle 400. Accordingly, the main structure portion 410 of the knuckle 400 receives various thrust loads and radial loads that are input via the bearing 830 and the bearing 800.

More specifically, of the bearings 820 and 830 that rotatably support the output shaft 710 (i.e., the rotor 750) of the motor 700 on both sides in the vehicle width direction, the bearing 830 that is on the vehicle outside is arranged in the main structure portion 410 of the knuckle 400, and the bearing 820 that is on the vehicle inside is arranged outside the main structure portion 410 of the knuckle 400. Also, of the bearings 800 and 810 that rotatably support the shaft 250, which serves as the rotating center shaft of the counter gear 214, on both sides in the vehicle width direction, the bearing 800 that is on the vehicle inside is arranged inside the main structure portion 410 of the knuckle 400, and the bearing 810 that is on the vehicle outside is arranged outside the main structure portion 410 of the knuckle 400.

Here, in this example embodiment, the bearing 830 has a larger load capacity (i.e., load facility) than the corresponding bearing 820. Similarly, the bearing 800 has a larger load capacity than the corresponding bearing 810. That is, the dynamic load rating or the dynamic equivalent load of the bearings 830 and 800 can be made higher than those of corresponding bearings 820 and 810 by, for example, making the diameters of the bearings 830 and 800 larger than the diameters of the corresponding bearings 820 and 810.

According to this structure, with respect to the output shaft 710 of the motor 700, when an axial force is generated with the operation of the reduction mechanism 200 that rotates as the output shaft 710 of the motor 700 rotates, that axial force is mainly received by the side with the bearing 830 which has a large load capacity. That is, the axial force is received by the main structure portion 410 of the knuckle 400 via the bearing 830. Similarly, with respect to the shaft 250 of the planetary gear set 220, when axial force is generated with the operation of the reduction mechanism 200 that rotates as the output shaft 710 of the motor 700 rotates, the axial force is mainly received by the side with the bearing 800 which has a large load capacity. That is, the axial force is received by the main structure portion 410 of the knuckle 400 via the bearing 800.

In this way, according to this example embodiment, the bearings 830 and 800 that receive axial force are arranged inside the extremely strong and rigid main structure portion 410 of the knuckle 400. Therefore, a reasonable structure can be realized in which large loads are received by the main structure portion 410 of the knuckle 400, which is a very strong and rigid portion. Accordingly, for example, conversely, with a structure in which a larger axial force is received by the bearing 820 than is received by the bearing 830, the peripheral wall portion 430 of the knuckle 400 and the motor cover 750 must be made thick to ensure the necessary strength and rigidity. However, in contrast to this structure, with this example embodiment there is no need to increase the strength and rigidity of the peripheral wall portion 430 of the knuckle 400 and the motor cover 750 so the peripheral wall portion 430 of the knuckle 400 and the motor cover 750 can be made thinner. Also, similarly, with a structure in which a larger axial force is received by the bearing 810 than is received by the 800, for example, the power transmitting member 270 must be make thick to ensure the necessary strength and rigidity. However, in contrast to this structure, with this example embodiment there is no need to increase the strength and rigidity of the power transmitting member 270 so the power transmitting member 270 can be made thinner.

As described above, according to this example embodiment, the mass and build of the overall knuckle 400 are made smaller, thus reducing the weight, while maintaining the necessary durability (life) of the bearings 800, 810, 820, and 830. At the same time, the open space inside the tire/wheel assembly 10 can be increased which reduces the restrictions on the suspension design.

While example embodiments of the invention have been illustrated above, it is to be understood that the invention is not limited to details of the illustrated embodiments, but may be embodied with various changes, modifications or improvements without departing from the spirit and scope of the invention.

For example, in the example shown in the drawings, the reduction mechanism 200 realizes a two step reduction, but it may also realize a three or more step reduction. For example, the reduction mechanism 200 may realize a first step reduction using the counter gear mechanism and realize second and third step reductions using two planetary gear sets that are connected in series.

Also, when the mounting point for the upper suspension arm is installed on the upper peripheral wall portion 430 of the knuckle 400, part of the upper peripheral wall portion 430 of the knuckle 400 may be make thick. In this case, the mounting point for the upper suspension arm can determine the upper boundary of the main structure portion 410 of the knuckle 400, as well as determine the vehicle inside boundary of the main structure portion 410 of the knuckle 400.

Moreover, in the example shown in the drawings, the motor 700 is arranged offset toward the vehicle front side with respect to the axle center. However, the motor 700 may also be arranged offset toward the vehicle rear side with respect to the axle center, in which case the brake caliper 120 may be arranged on the vehicle front side.

Further, the illustrated example shows a wheel assembly with an in-wheel motor related to a steered wheel, but the invention can also be applied to a wheel other than a steered wheel.

What is claimed:

1. A wheel assembly with an in-wheel motor, which transmits rotational output of an output shaft of the motor to a wheel via a counter gear, comprising:

a first bearing provided on a vehicle inside, in a vehicle width direction, and a second bearing provided on a vehicle outside, in the vehicle width direction, which rotatably support the output shaft of the motor;

a third bearing provided on the vehicle inside, in the vehicle width direction, and a fourth bearing provided on the vehicle outside, in the vehicle width direction, which rotatably support a rotating center shaft of the counter gear; and a main structure portion of a knuckle that defines a transfer path of a load input to the wheel, wherein the second bearing and the third bearing are arranged inside the main structure portion of the knuckle such that the main structure portion of the knuckle supports the second bearing and the third bearing, wherein the main structure portion of the knuckle includes connecting portions for a tie rod and a suspension arm, a connecting portion for a brake caliper, and a connecting portion for an axle bearing, and receives a load input from these connecting portions, wherein the output shaft of the motor is arranged offset upward and forward with respect to an axle center, wherein a lower ball joint is connected to a wheel-side end portion of a lower arm of the suspension arm and a ball joint is connected to a wheel-side end portion of the tie rod, and wherein the lower ball joint of the lower arm is arranged near a brake disc in the vehicle width direction; and the ball joint of the tie rod is arranged inside the wheel.

2. A wheel assembly with an in-wheel motor, which transmits rotational output of an output shaft of the motor to a wheel via a counter gear, comprising:

a first bearing provided on a vehicle inside, in a vehicle width direction, and a second bearing provided on a vehicle outside, in the vehicle width direction, which rotatably support the output shaft of the motor;

a third bearing provided on the vehicle inside, in the vehicle width direction, and a fourth bearing provided on the vehicle outside, in the vehicle width direction, which rotatably support a rotating center shaft of the counter gear; and a main structure portion of a knuckle that defines a transfer path of a load input to the wheel, wherein the second bearing and the third bearing are arranged inside the main structure portion of the knuckle such that the main structure portion of the knuckle supports the second bearing and the third bearing, wherein the second bearing has a larger load capacity than the first bearing on the vehicle inside; and the third bearing has a larger load capacity than the fourth bearing, wherein the main structure portion of the knuckle includes connecting portions for a tie rod and a suspension arm, a connecting portion for a brake caliper, and a connecting portion for an axle bearing, and receives a load input from these connecting portions, wherein the output shaft of the motor is arranged offset upward and forward with respect to an axle center, wherein a lower ball joint is connected to a wheel-side end portion of a lower arm of the suspension arm and a ball joint is connected to a wheel-side end portion of the tie rod, and wherein the lower ball joint of the lower arm is arranged near a brake disc in the vehicle width direction and the ball joint of the tie rod is arranged inside the wheel.

* * * * *